United States Patent
Koga et al.

(10) Patent No.: US 6,852,155 B2
(45) Date of Patent: Feb. 8, 2005

(54) WATER BASE INK SET FOR INK-JET RECORDING

(75) Inventors: Narumi Koga, Nagoya (JP); Kazuma Goto, Nagoya (JP); Hiromitsu Sago, Tokai (JP); Hideo Ohira, Tajimi (JP); Shunichi Higashiyama, Yotsukaichi (JP); Masaya Fujioka, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/373,530

(22) Filed: Feb. 25, 2003

(65) Prior Publication Data

US 2003/0193555 A1 Oct. 16, 2003

(30) Foreign Application Priority Data

Feb. 26, 2002 (JP) ........................ 2002-050268

(51) Int. Cl.$^7$ ............................................. C09D 11/02
(52) U.S. Cl. ................. 106/31.58; 106/31.86
(58) Field of Search ............................ 106/31.58, 31.86

(56) References Cited

U.S. PATENT DOCUMENTS

| | | | | |
|---|---|---|---|---|
| 5,985,975 A | * | 11/1999 | Kurabayashi et al. | 524/462 |
| 6,033,463 A | * | 3/2000 | Yui et al. | 106/31.27 |
| 6,080,229 A | * | 6/2000 | Watanabe et al. | 106/31.43 |
| 6,204,307 B1 | * | 3/2001 | Miyabayashi | 523/160 |
| 6,299,675 B1 | * | 10/2001 | Ono et al. | 106/31.27 |
| 6,460,989 B1 | * | 10/2002 | Yano et al. | 347/101 |
| 2002/0062762 A1 | * | 5/2002 | Tomioka et al. | 106/31.33 |
| 2003/0067525 A1 | * | 4/2003 | Goto et al. | 347/100 |
| 2003/0070581 A1 | * | 4/2003 | Tomioka et al. | 106/31.33 |
| 2003/0095171 A1 | * | 5/2003 | Kaga et al. | 347/104 |
| 2003/0101905 A1 | * | 6/2003 | Momose | 106/31.58 |
| 2003/0103121 A1 | * | 6/2003 | Tomioka et al. | 347/100 |
| 2003/0107631 A1 | * | 6/2003 | Goto et al. | 347/100 |
| 2003/0109600 A1 | * | 6/2003 | Shirota et al. | 523/160 |

\* cited by examiner

*Primary Examiner*—Mark L. Bell
*Assistant Examiner*—Veronica F. Faison
(74) *Attorney, Agent, or Firm*—Reed Smith LLP

(57) ABSTRACT

A water base ink set for ink-jet recording comprises a black ink which contains a black pigment, water, and a water-soluble organic solvent, and a color ink which contains a dye, water, a water-soluble organic solvent, and at least one compound represented by the following formulas (1) to (3), wherein the nozzle clog-up at an ink-jet head and the malfunction of a purging pump, which would be otherwise caused by the aggregation of the black ink, can be avoided:

$$R^1-O-(CH_2CH_2O)_x-SO_3.Na \qquad (1)$$

wherein $R^1$ represents a straight chain alkyl group having a number of carbon atoms of 16 to 22, and $x=20$ to 30 is satisfied in the formula (1);

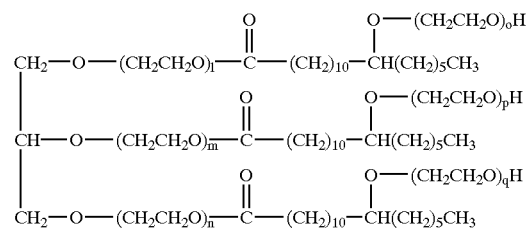

(2)

wherein $l+m+n+o+p+q=20$ to $100$ is satisfied in the formula (2); and

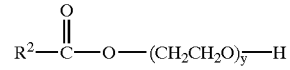

(3)

wherein $R^2$ represents a straight chain alkyl group having a number of carbon atoms of 16 to 22, and $y=100$ to $300$ is satisfied in the formula (3).

15 Claims, 3 Drawing Sheets

WATER BASE INK SET FOR INK-JET RECORDING

BACKGROUND OF THE INVENTION

1. Field of the Invention

The present invention relates to a water base ink set for ink-jet recording and an ink-jet recording apparatus which accommodates the same.

2. Related Art

The printer technique based on the ink-jet recording system is the printing technique based on, for example, the bubble system in which an ink is discharged from a minute diameter nozzle by the aid of bubbles generated by rapid heating, or the piezoelectric system in which an ink is discharged from a minute diameter nozzle by using a piezoelectric device which is deformable in accordance with the voltage application. Inks, which have several colors respectively to serve as fundamental colors, are converted into minute droplets of several picoliters to several tens picoliters, and they are selectively landed on the paper surface to form an image thereby.

The ink-jet recording system is advantageous in that an image, which has color reproduction approximate to the full color and which has no granular texture, can be formed by highly accurately controlling the discharge of the minute droplets, and thus the high letter-printing quality and the high image-printing quality are obtained. Further, when a pigment is used as the coloring agent, it is also possible to reproduce a sharp edge equivalent to those obtained by a laser printer.

It is affirmed for the water base ink for ink-jet recording that the use of a black pigment as the coloring agent for the black ink is useful in order to reproduce a sharp edge, for example, when letters and ruled lines are printed. It is also affirmed that the use of a dye as the coloring agent for the color ink is useful in order to form a colorful and vivid image such as a photograph. However, when the black ink, in which the black pigment is used as the coloring agent, is used in combination with the color ink in which the dye is used as the coloring agent, then the dispersion state of the black ink dispersed in the black ink becomes unstable due to the contact between the black ink and the color ink, and any aggregation is caused in some cases. The ink-jet recording system is based on such a mechanism that the ink is discharged highly accurately from the nozzle having the minute diameter. Therefore, the following problem has been hitherto caused. That is, if the aggregation occurs in the vicinity of the nozzle, the nozzle is clogged to cause any serious deterioration of the printing quality including, for example, the discharge curvature and the discharge failure of the ink. Further, the following problem has been hitherto caused as well. That is, if the aggregation occurs in a suction pump for the maintenance, the pump malfunctions.

SUMMARY OF THE INVENTION

The present invention has been made in order to solve the problems as described above, an object of which is to provide a water base ink set for ink-jet recording having high reliability which causes no serious deterioration of the printing quality including, for example, the discharge failure and the discharge curvature when the water base ink set is used in an ink-jet printer, without causing any aggregation of a black pigment dispersed in a black ink due to the contact between the black ink and a color ink when the black ink and the color ink are used in combination. Another object of the present invention is to provide an ink-jet recording apparatus which accommodates the water base ink set of the present invention.

According to the present invention, there is provided a water base ink set for ink-jet recording comprising a black ink and a color ink, wherein the black ink contains at least a black pigment, water, and a water-soluble organic solvent, and the color ink contains at least a dye, water, a water-soluble organic solvent, and at least one compound selected from the group consisting of polyoxyethylene alkyl ether sodium sulfate represented by the following formula (1), polyoxyethylene hardened castor oil represented by the following formula (2), and polyoxyethylene alkyl ester represented by the following formula (3):

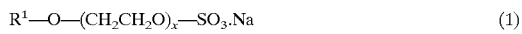

wherein $R^1$ represents a straight chain alkyl group having a number of carbon atoms of 16 to 22, and x=20 to 30 is satisfied in the formula (1);

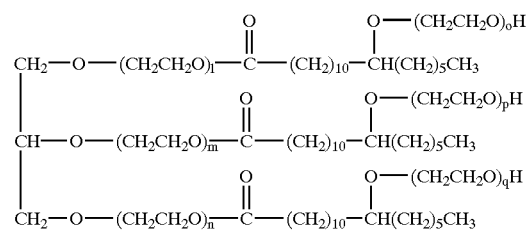

wherein l+m+n+o+p+q=20 to 100 is satisfied in the formula (2); and

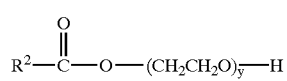

wherein $R^2$ represents a straight chain alkyl group having a number of carbon atoms of 16 to 22, and y=100 to 300 is satisfied in the formula (3).

According to another aspect of the present invention, there is provided an ink-jet recording apparatus comprising:
an ink-jet head which jets a black ink and a color ink; and
an ink tank which accommodates an ink set having the black ink and the color ink, wherein:
the black ink contains a black pigment, water, and a water-soluble organic solvent, and the color ink contains a dye, water, a water-soluble organic solvent, and at least one compound selected from the group consisting of the compounds (1), (2), and (3) represented by the formulas described above. The recording apparatus may comprise a wiper which wipes the ink-jet head, and a purge unit which purges the ink-jet head. The ink tank may be an ink container fixedly provided in the apparatus or an ink cartridge which is replaceable.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
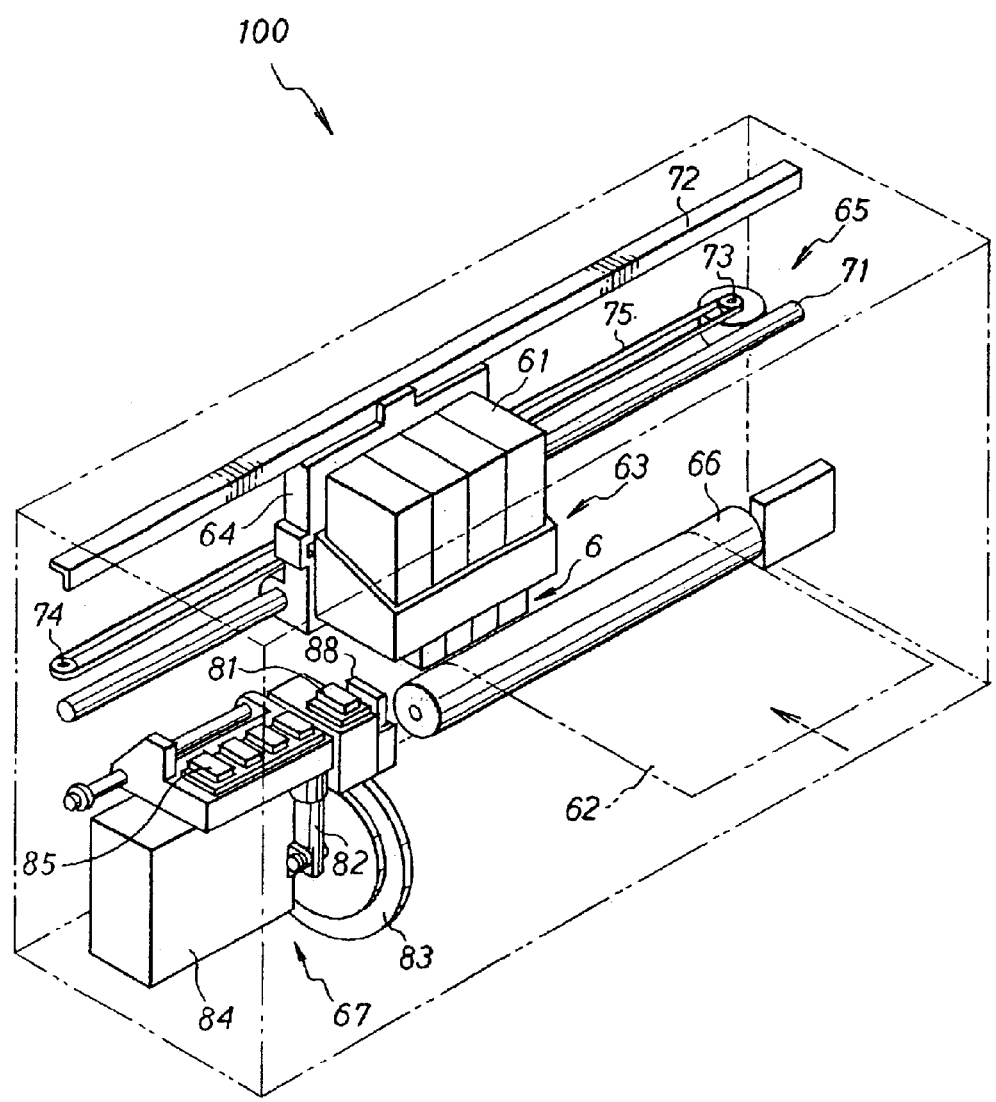
FIG. 1 is a perspective view showing a color ink-jet printer having an ink cartridge which contains ink prepared in examples of the invention.

The water base ink set for ink-jet recording of the present invention comprises the black ink and the color ink. The black ink contains at least the black pigment, water, and the water-soluble organic solvent.

The black pigment is dispersed as the coloring agent in the black ink. The black pigment is not specifically limited, and it is possible to use known compounds which are commercially available. In particular, a self-dispersing type black pigment, to which a surface-modifying treatment is applied and in which a hydrophilic anionic functional group such as carboxylate and sulfonate is added to surfaces of pigment particles, is preferably used.

The blending amount of the black pigment in the black ink is preferably 0.1 t 20% by weight, more preferably 0.3 to 15% by weight, and much more preferably 0.5 to 10% by weight as represented by the solid content with respect to the total amount of the ink.

Deionized water (pure water) is preferably used as the water. The blending amount of water in the black ink is preferably not less than 40% by weight with respect to the total amount of the black ink. If the blending amount is less than 40% by weight, it is sometimes impossible to maintain the viscosity of the black ink in the ordinary state to be a low viscosity at which the jetting operation can be normally performed.

The water-soluble organic solvent is principally used in order to avoid the deposition and the drying-up of the black ink at the tip of the ink-jet head. It is preferable to use, as the water-soluble organic solvent, those in which the volatility is low and which do not inhibit the dispersion stability of the black pigment particles. Specifically, the water-soluble organic solvent may be exemplified, for example, by poly-alkylene glycols such as polyethylene glycol; alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol, and hexylene glycol; glycerol; and pyrrolidones such as 2-pyrrolidone and N-methyl-2-pyrrolidone. The water-soluble organic solvent as described above may be used singly. Alternatively, two or more of the water-soluble organic solvents as described above may be used in combination.

The content of the water-soluble organic solvent in the black ink is preferably 5 to 40% by weight, more preferably 7 to 40% by weight, and much more preferably 10 to 40% by weight with respect to the total amount of the black ink. If the content is less than 5% by weight, then the moistening function is insufficient, and problems such as the deposition and the drying-up arise in some cases. If the content exceeds 40% by weight, then the viscosity of the black ink is unnecessarily increased. As a result, for example, problems sometimes arise such that the ink cannot be discharged and the ink is dried extremely slowly on the recording paper.

The black ink may contain at least one compound selected from the group consisting of polyoxyethylene alkyl ether sodium sulfate represented by the following formula (1), polyoxyethylene hardened castor oil represented by the following formula (2), and polyoxyethylene alkyl ester represented by the following formula (3) described below.

$$R^1\text{—O—}(CH_2CH_2O)_x\text{—}SO_3.Na \tag{1}$$

In the formula (1), $R^1$ represents a straight chain alkyl group having a number of carbon atoms of 16 to 22, and $x=20$ to 30 is satisfied.

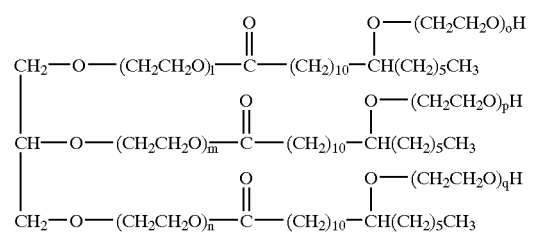

$$\tag{2}$$

In the formula (2), $l+m+n+o+p+q=20$ to 100 ($l\neq 0$, $m\neq 0$, $n\neq 0$, $o\neq 0$, $p\neq 0$, and $q\neq 0$) is satisfied.

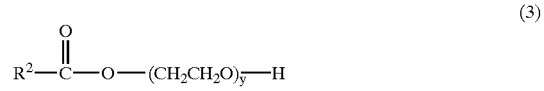

$$\tag{3}$$

In the formula (3), $R^2$ represents a straight chain alkyl group having a number of carbon atoms of 16 to 22, and $y=100$ to 300 is satisfied.

The color ink contains at least the dye, water, and the water-soluble organic solvent. The dye is used as the coloring agent of the color ink. The dye is not specifically limited. However, it is preferable to use cationic or anionic dyes including, for example, basic dyes, acid dyes, direct dyes, and reactive dyes. Specifically, the dye may be exemplified, for example, by Color Index No. Basic Red 1, 1:1, 2, 12, 13, 14, 18, 22, 27, 28, 29, 34, 38, 39, 46, 46:1, 67, 69, 70; Color Index No. Basic Violet 1, 2, 3, 4, 5, 7, 8, 10, 11, 11:1, 20, 33; Color Index No. Basic Blue 3, 6, 7, 9, 11, 12, 16, 17, 24, 26, 41, 47, 66; Color Index No. Basic Green 1, 4, 5; Color Index No. Basic Yellow 1, 11, 19, 21, 24, 25, 28, 29, 36, 45, 51, 67, 73; Color Index No. Basic orange 14, 21, 22, 32; Color Index No. Basic Brown 1, 4; Color Index No. Direct Black 17, 19, 32, 51, 71, 108, 146, 154, 168; Color Index No. Direct Blue 6, 22, 25, 71, 86, 90, 106, 199; Color Index No. Direct Red 1, 4, 17, 28, 83, 227; Color Index No. Direct Yellow 12, 24, 26, 86, 98, 132, 142; Color Index No. Direct Orange 34, 39, 44, 46, 60; Color Index No. Direct Violet 47, 48; Color Index No. Direct Brown 109; Color Index No. Direct Green 59; Color Index No. Acid Black 2, 7, 24, 26, 31, 52, 63, 112, 118; Color Index No. Acid Blue 9, 22, 40, 59, 93, 102, 104, 113, 117, 120, 167, 229, 234; Color Index No. Acid Red 1, 6, 32, 37, 51, 52, 80, 85, 87, 92, 94, 115, 181, 256, 289, 315, 317; Color Index No. Acid Yellow 11, 17, 23, 25, 29, 42, 61, 71; Color Index No. Acid Orange 7, 19; Color Index No. Acid Violet 49; Color Index No. Food Black 1, 2; and Color Index No. Reactive Red 180. The dye as described above may be used singly. Alternatively, two or more of the dyes as described above may be used in combination.

The blending amount of the dye in the color ink is preferably 0.1 to 20% by weight, more preferably 0.3 to 15% by weight, and much more preferably 0.5 to 10% by weight with respect to the total amount of the color ink.

Deionized water (pure water) is preferred as the water to be used for the color ink. It is preferable that the water to be used for the color ink is blended in the color ink in an amount of not less than 40% by weight with respect to the total amount of the color ink, for the following reason. That is, if the blending amount is less than 40% by weight, the viscosity of the color ink in the ordinary state cannot be maintained to be a low viscosity at which the jetting operation can be normally performed.

The water-soluble organic solvent to be used for the color ink is principally used in order to prevent the color ink from the deposition and the drying-up at the tip of the ink-jet head. Those having low volatility and high dye-dissolving ability are preferred as the water-soluble organic solvent to be used for the color ink. Specifically, the water-soluble organic solvent may be exemplified, for example, by those equivalent to the water-soluble organic solvent to be used for the black ink. The water-soluble organic solvent may be used singly. Alternatively, two or more of the water-soluble organic solvents may be used in combination.

The blending amount of the water-soluble organic solvent to be used for the color ink in the color ink is preferably 5 to 40% by weight, more preferably 7 to 40% by weight, and much more preferably 10 to 40% by weight with respect to the total amount of the color ink. If the blending amount is less than 5% by weight, then the moistening function is insufficient, and problems such as the deposition and the drying-up arise in some cases. If the content exceeds 40% by weight, then the viscosity of the color ink is unnecessarily increased. As a result, for example, problems sometimes arise such that the ink cannot be discharged and the ink is dried extremely slowly on the recording paper.

The color ink contains at least one compound selected from the group consisting of the compound (1) represented by the following formula (1), the compound (2) represented by the following formula (2), and the compound (3) represented by the following formula (3) in addition to the dye, the water, and the water-soluble organic solvent described above.

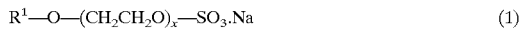

(1)

In the formula (1), $R^1$ represents a straight chain alkyl group having a number of carbon atoms of 16 to 22, and x=20 to 30 is satisfied. Preferably, $R^1$ represents an oleyl group having a number of carbon atoms of 18, and x=23 to 25 is satisfied. When $R^1$ represents an oleyl group having a number of carbon atoms of 18, and x=23 to 25 is satisfied, then the effect to prevent the black pigment from aggregation is raised. The compound (1) is not specifically limited. However, for example, it is preferable to use LEVENOL WX and LATEMUL WX (produced by Kao Corporation).

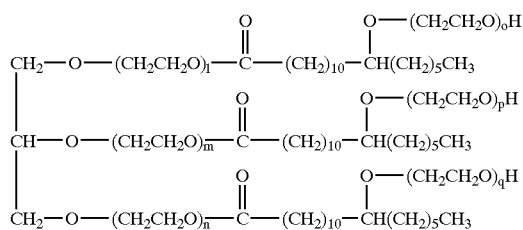

(2)

In the formula (2), l+m+n+o+p+q=20 to 100 is satisfied. Preferably, l+m+n+o+p+q=25 to 80 is satisfied. When l+m+n+o+p+q=25 to 80 is satisfied, the effect to prevent the black pigment from aggregation is enhanced. The compound (2) is not specifically limited. However, for example, it is preferable to use EMANON CH-25, EMANON CH-40, EMANON 60(K), and EMANON CH-80 (produced by Kao Corporation). More preferably, l+m+n+o+p+q=40 to 80 is satisfied.

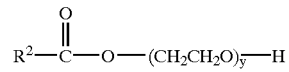

(3)

In the formula (3), $R^2$ represents a straight chain alkyl group having a number of carbon atoms of 16 to 22, and y=100 to 300 is satisfied. Preferably, $R^2$ represents a stearyl group having a number of carbon atoms of 18, and y=140 to 250 is satisfied. When $R^2$ represents a stearyl group having a number of carbon atoms of 18, and y=140 to 250 is satisfied, then the effect to prevent the black pigment from aggregation is raised. The compound (3) is not specifically limited. However, for example, it is preferable to use EMANON 3199, EMANON 3299, and EMANON 3299R (produced by Kao Corporation).

The blending amount in the color ink of the at least one compound selected from the group consisting of the compounds (1), (2), and (3) is preferably 0.001 to 5% by weight, more preferably 0.01 to 3% by weight, and much more preferably 0.05 to 1% by weight with respect to the total amount of the color ink.

Further, for example, it is possible to add, to the black ink and the color ink described above, conventionally known permeating agents, resin binders, dispersing agents, surfactants, viscosity-adjusting agents, surface tension-adjusting agents, pH-adjusting agents, dye-dissolving agents, and antiseptic/fungicidal agents, if necessary.

The permeating agent effectively quicken the permeation velocity of the ink into the recording paper. Accordingly, the permeating agent is used to improve the quick drying property of the ink on the paper surface, avoid the bleeding (blurring at the boundary between different colors) caused by the slow drying property on the recording paper, and avoid the feathering (whisker-like blurring along the paper fibers) caused by the permeation. The permeating agent is not specifically limited. For example, the permeating agent may be exemplified by polyvalent alcohol monoalkyl ether and monovalent alcohol. In particular, it is preferable to use polyvalent alcohol monoalkyl ether ethanol which has a low odor and a low vapor pressure.

The polyvalent alcohol monoalkyl ether is not specifically limited. For example, the polyvalent alcohol may be exemplified by diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether.

It is preferable that the content of the polyvalent alcohol alkyl ether in the black ink or the color ink is 3 to 15% by weight with respect to the total amount of the ink. If the content is less than 3% by weight, the permeation velocity of the ink into the recording paper is slow. As a result, problems arise in the drying time and the blur in some cases. If the content exceeds 15% by weight, the ink excessively permeates into the recording paper. As a result, the ink consequently arrives at the back of the recording paper, and a problem sometimes arises in the blur.

The monovalent alcohol is not specifically limited. For example, the monovalent alcohol may be exemplified by ethanol and isopropyl alcohol.

When the water base ink set for ink-jet recording of the present invention is applied to the ink-jet system of the type in which the ink is discharged in accordance with the action of the thermal energy, values of thermal physical properties including, for example, those of the specific heat, the coefficient of thermal expansion, and the coefficient of thermal conductivity are adjusted in some cases.

The compounds (1), (2), and (3) have the effect to stabilize the dispersion state of the black pigment in the black ink in the water base ink set for ink-jet recording of the present invention. When the compounds (1), (2), and (3) are added in the color ink as described above, the dispersion of the black pigment in the black ink is not unstable even when the black ink and the color ink make contact with each other. Therefore, it is possible to avoid the aggregation. Accordingly, the water base ink set for ink-jet recording of the present invention successfully avoids, for example, the occurrence of clog-up at the nozzle, even when the black ink and the color ink are applied in combination to an ink-jet printer. Therefore, it is possible to avoid the serious deterioration of the printing quality such as the discharge failure and the discharge curvature, and it is possible to obtain the high reliability. Further, it is possible to stabilize the operation of a suction pump for the maintenance.

The present invention will be explained in further detail below as exemplified by Examples. However, the present invention is not limited to only Examples.

EXAMPLE 1

LEVENOL WX (produced by Kao Corporation) ($R^1$= $C_{16}H_{35}$, x=25 in the formula (1)) was added as the compound (1) described above to a magenta ink and a cyan ink, and EMANON CH-25 (produced by Kao Corporation) was added as the compound (2) described above to a yellow ink to prepare a water base ink set for ink-jet recording having a composition shown in Table 1.

TABLE 1

| Ink set of Example 1 | Black ink (% by weight) | Yellow ink (% by weight) | Magenta ink (% by weight) | Cyan ink (% by weight) |
|---|---|---|---|---|
| CABOJET 300 (produced by Cabot) | 30 | — | — | — |
| Glycerol | 28 | 30 | 30 | 31 |
| Triethylene glycol-n-butyl ether | 3 | 5 | 5 | 5 |
| LEVENOL WX (produced by Kao Corporation) | — | — | 0.4 | 0.4 |
| EMANON CH-25 (produced by Kao Corporation) | — | 0.2 | — | — |
| C. I. Direct Yellow 132 | — | 3 | — | — |
| C. I. Acid Red 52 | — | — | 1 | — |
| C. I. Acid Red 289 | — | — | 1.2 | — |
| C. I. Direct Blue 199 | — | — | — | 2.5 |
| Pure water | balance | balance | balance | balance |

EXAMPLE 2

EMANON CH-60 (K) (produced by Kao Corporation) (l+m+n+o+p+q=60 in the formula (2)) was added as the compound (2) described above to a yellow ink, a magenta ink, and a cyan ink to prepare a water base ink set for ink-jet recording having a composition shown in Table 2.

TABLE 2

| Ink set of Example 2 | Black ink (% by weight) | Yellow ink (% by weight) | Magenta ink (% by weight) | Cyan ink (% by weight) |
|---|---|---|---|---|
| CABOJET 300 (produced by Cabot) | 30 | — | — | — |
| Glycerol | 28 | 30 | 32 | 31 |
| Triethylene glycol-n-butyl ether | 3 | 5 | 5 | 5 |
| EMANON CH-60 (K) (produced by Kao Corporation) | — | 0.2 | 0.2 | 0.2 |
| C. I. Direct Yellow 86 | — | 3 | — | — |
| C. I. Acid Red 52 | — | — | 3.5 | — |
| C. I. Direct Blue 199 | — | — | — | 2.5 |
| Pure water | balance | balance | balance | balance |

EXAMPLE 3

EMANON 3199 (produced by Kao Corporation) ($R^2$= $C_{17}H_{35}$, y=140 in the formula (3)) was added as the compound (3) described above to a yellow ink, a magenta ink, and a cyan ink to prepare a water base ink set for ink-jet recording having a composition shown in Table 3.

TABLE 3

| Ink set of Example 3 | Black ink (% by weight) | Yellow ink (% by weight) | Magenta ink (% by weight) | Cyan ink (% by weight) |
|---|---|---|---|---|
| CABOJET 300 (produced by Cabot) | 30 | — | — | — |
| Glycerol | 22 | 24 | 25 | 26 |
| Diethylene glycol | 6 | 5 | 5 | 5 |
| Triethylene glycol-n-butyl ether | 4 | 5 | 5 | 5 |
| EMANON 3199 (produced by Kao Corporation) | — | 0.3 | 0.3 | 0.35 |
| C. I. Direct Yellow 132 | — | 4 | — | — |
| C. I. Acid Red 227 | — | — | 4 | — |
| C. I. Acid Blue 9 | — | — | — | 3 |
| Pure water | balance | balance | balance | balance |

EXAMPLE 4

EMANON CH-80 (produced by Kao Corporation) (l+m+n+o+p+q=80 in the formula (2)) was added as the compound (2) described above to a black ink, a yellow ink, a magenta ink, and a cyan ink to prepare a water base ink set for ink-jet recording having a composition shown in Table 4.

TABLE 4

| Ink set of Example 4 | Black ink (% by weight) | Yellow ink (% by weight) | Magenta ink (% by weight) | Cyan ink (% by weight) |
|---|---|---|---|---|
| CABOJET 200 (produced by Cabot) | 35 | — | — | — |
| Glycerol | 20 | 25 | 27 | 28 |
| 2-Pyrrolidone | 10 | 3 | 3 | 3 |
| Dipropylene glycol n-propyl ether | 3 | 3 | 3 | 3 |
| EMANON CH-80 (produced by Kao Corporation) | 0.2 | 0.2 | 0.2 | 0.2 |
| C. I. Direct Yellow 132 | — | 3.5 | — | — |
| C. I. Acid Red 52 | — | — | 1 | — |

TABLE 4-continued

| Ink set of Example 4 | Black ink (% by weight) | Yellow ink (% by weight) | Magenta ink (% by weight) | Cyan ink (% by weight) |
|---|---|---|---|---|
| C. I. Acid Red 289 | — | — | 1.5 | — |
| C. I. Direct Blue 199 | — | — | — | 2.5 |
| Pure water | balance | balance | balance | balance |

EXAMPLE 5

LEVENOL WX (produced by Kao Corporation) ($R^1 = C_{16}H_{35}$, x=25 in the formula (1)) was added as the compound (1) described above to a yellow ink, a magenta ink, and a cyan ink to prepare a water base ink set for ink-jet recording having a composition shown in Table 5.

TABLE 5

| Ink set of Example 5 | Black ink (% by weight) | Yellow ink (% by weight) | Magenta ink (% by weight) | Cyan ink (% by weight) |
|---|---|---|---|---|
| CABOJET 200 (produced by Cabot) | 33 | — | — | — |
| Glycerol | 24 | 25 | 25 | 23 |
| Dipropylene glycol | 5 | 5 | 5 | 5 |
| Triethylene glycol-n-butyl ether | 3 | 5 | 5 | 5 |
| LEVENOL WX (produced by Kao Corporation) | — | 0.4 | 0.1 | 0.1 |
| C. I. Direct Yellow 132 | — | 3 | — | — |
| C. I. Direct Red 227 | — | — | 4 | — |
| C. I. Direct Blue 199 | — | — | — | 3.5 |
| Pure water | balance | balance | balance | balance |

EXAMPLE 6

LATEMUL WX (produced by Kao Corporation) ($R^1 = C_{18}H_{35}$, x=23 in the formula (1)) was added as the compound (1) described above to a cyan ink, and EMANON CH-40 (produced by Kao Corporation) (l+m+n+o+p+q=40 in the formula (2)) was added as the compound (2) described above to a yellow ink and a magenta ink to prepare a water base ink set for ink-jet recording having a composition shown in Table 6.

TABLE 6

| Ink set of Example 6 | Black ink (% by weight) | Yellow ink (% by weight) | Magenta ink (% by weight) | Cyan ink (% by weight) |
|---|---|---|---|---|
| CABOJET 300 (produced by Cabot) | 30 | — | — | — |
| Glycerol | 18 | 34 | 32 | 33 |
| Diethylene glycol | 10 | 3 | 3 | 3 |
| Tripropylene glycol-n-butyl ether | 0.5 | 1 | 1 | 1 |
| LATEMUL WX (produced by Kao Corporation) | — | — | — | 0.5 |
| EMANON CH-40 (produced by Kao Corporation) | — | 0.3 | 0.3 | — |
| C. I. Direct Yellow 132 | — | 2.5 | — | — |
| C. I. Direct Yellow 86 | — | 0.5 | — | — |
| C. I. Acid Red 52 | — | — | 1.5 | — |
| C. I. Acid Red 289 | — | — | 2 | — |
| C. I. Direct Blue 199 | — | — | — | 2.5 |
| C. I. Acid Blue 9 | — | — | — | 0.5 |
| Pure water | balance | balance | balance | balance |

EXAMPLE 7

EMANON 3299 (produced by Kao Corporation) ($R^2 = C_{17}H_{35}$, y=250 in the formula (3)) was added as the compound (3) described above to a yellow ink, a magenta ink, and a cyan ink to prepare a water base ink set for ink-jet recording having a composition shown in Table 7.

TABLE 7

| Ink set of Example 7 | Black ink (% by weight) | Yellow ink (% by weight) | Magenta ink (% by weight) | Cyan ink (% by weight) |
|---|---|---|---|---|
| CABOJET 300 (produced by Cabot) | 33 | — | — | — |
| Glycerol | 20 | 30 | 30 | 31 |
| Triethylene glycol-n-butyl ether | 8 | 5 | 5 | 5 |
| EMANON 3299 (produced by Kao Corporation) | — | 0.3 | 0.3 | 0.3 |
| C. I. Direct Yellow 132 | — | 3 | — | — |
| C. I. Acid Red 52 | — | — | 1 | — |
| C. I. Acid Red 289 | — | — | 1.2 | — |
| C. I. Direct Blue 199 | — | — | — | 2.5 |
| Pure water | balance | balance | balance | balance |

EXAMPLE 8

LATEMUL WX (produced by Kao Corporation) ($R^1 = C_{18}H_{35}$, x=23 in the formula (1)) was added as the compound (1) described above to a black ink, a magenta ink, and a cyan ink, and EMANON CH-40 (produced by Kao Corporation) (l+m+n+o+p+q=40 in the formula (2)) was added as the compound (2) described above to a yellow ink to prepare a water base ink set for ink-jet recording having a composition shown in Table 8.

TABLE 8

| Ink set of Example 8 | Black ink (% by weight) | Yellow ink (% by weight) | Magenta ink (% by weight) | Cyan ink (% by weight) |
|---|---|---|---|---|
| CABOJET 200 (produced by Cabot) | 30 | — | — | — |
| Glycerol | 25 | 24 | 23 | 25 |
| Triethylene glycol | 5 | 8 | 8 | 8 |
| Diethylene glycol-n-butyl ether | 3 | 3 | 3 | 3 |
| LATEMUL WX (produced by Kao Corporation) | 0.3 | — | 0.3 | 0.3 |
| EMANON CH-40 (produced by Kao Corporation) | — | 0.2 | — | — |
| C. I. Direct Yellow 86 | — | 2.5 | — | — |
| C. I. Direct Red 227 | — | — | 3 | — |
| C. I. Direct Blue 199 | — | — | — | 2.5 |
| C. I. Acid Blue 9 | — | — | — | 0.5 |
| Pure water | balance | balance | balance | balance |

Comparative Examples 1 to 8

Water base ink sets for ink-jet recording of Comparative Examples 1, 2, 3, 4, 5, 6, 7, and 8 were prepared in the same manner as in Examples 1, 2, 3, 4, 5, 6, 7, and 8 except that the amounts of addition of pure water were increased by the same amounts as those of the compounds (1), (2), and (3) which were not added, in place of the addition of the compounds (1), (2), and (3) to the color inks.

Comparative Example 9

EMULGEN 409P (produced by Kao Corporation) (polyoxyethylene alkyl ether), which was an additive other than any one of the compounds (1), (2), and (3) described above, was added to a yellow ink, a magenta ink, and a cyan ink to prepare a water base ink set for ink-jet recording having a composition shown in Table 9.

TABLE 9

| Ink set of Comparative Example 9 | Black ink (% by weight) | Yellow ink (% by weight) | Magenta ink (% by weight) | Cyan ink (% by weight) |
|---|---|---|---|---|
| CABOJET 300 (produced by Cabot) | 30 | — | — | — |
| Glycerol | 28 | 30 | 30 | 31 |
| Triethylene glycol-n-butyl ether | 3 | 5 | 5 | 5 |
| EMULGEN 409P (produced by Kao Corporation) | — | 0.5 | 0.5 | 0.5 |
| C. I. Direct Yellow 132 | — | 3 | — | — |
| C. I. Acid Red 52 | — | — | 1 | — |
| C. I. Acid Red 289 | — | — | 1.2 | — |
| C. I. Direct Blue 199 | — | — | — | 2.5 |
| Pure water | balance | balance | balance | balance |

Comparative Example 10

EMANON 1112 (produced by Kao Corporation) (the number of carbon atoms included in the straight chain in the structure shown in the formula (3) is less than 16), which was an additive other than any one of the compounds (1), (2), and (3) described above, was added to a black ink, a yellow ink, a magenta ink, and a cyan ink to prepare a water base ink set for ink-jet recording having a composition shown in Table 10.

TABLE 10

| Ink set of Comparative Example 10 | Black ink (% by weight) | Yellow ink (% by weight) | Magenta ink (% by weight) | Cyan ink (% by weight) |
|---|---|---|---|---|
| CABOJET 300 (produced by Cabot) | 30 | — | — | — |
| Glycerol | 28 | 30 | 32 | 31 |
| Triethylene glycol-n-butyl ether | 3 | 5 | 5 | 5 |
| EMANON 1112 (produced by Kao Corporation) | 0.5 | 0.5 | 0.5 | 0.5 |
| C. I. Direct Yellow 86 | — | 3 | — | — |
| C. I. Acid Red 52 | — | — | 3.5 | — |
| C. I. Direct Blue 199 | — | — | — | 2.5 |
| Pure water | balance | balance | balance | balance |

Comparative Example 11

DEMOL N (produced by Kao Corporation) (naphthalenesulfonic acid-formalin condensate), which was an additive other than any one of the compounds (1), (2), and (3) described above, was added to a black ink, a yellow ink, a magenta ink, and a cyan ink to prepare a water base ink set for ink-jet recording having a composition shown in Table 11.

TABLE 11

| Ink set of Comparative Example 11 | Black ink (% by weight) | Yellow ink (% by weight) | Magenta ink (% by weight) | Cyan ink (% by weight) |
|---|---|---|---|---|
| CABOJET 200 (produced by Cabot) | 30 | — | — | — |
| Glycerol | 25 | 24 | 23 | 25 |
| Triethylene glycol | 5 | 8 | 8 | 8 |
| Diethylene glycol-n-butyl ether | 3 | 3 | 3 | 3 |
| DEMOL N (produced by Kao Corporation) | 0.5 | 0.5 | 0.5 | 0.5 |
| C. I. Direct Yellow 86 | — | 2.5 | — | — |
| C. I. Direct Red 227 | — | — | 3 | — |
| C. I. Direct Blue 199 | — | — | — | 2.5 |
| C. I. Acid Blue 9 | — | — | — | 0.5 |
| Pure water | balance | balance | balance | balance |

Evaluation

Each of the water base inks for ink-jet recording of the water base ink sets for ink-jet recording of Examples 1, 2, 3, 4, 5, 6, 7, and 8 and Comparative Examples 1, 2, 3, 4, 5, 6, 7, 8, 9, 10, and 11 was sufficiently mixed and agitated, followed by being filtrated with a membrane filter of 0.8 μm to use the obtained inks for the following evaluation.

Evaluation Test 1 (Evaluation of Aggregation)

A test for the contact between the black ink and the color ink was performed on a slide glass. The interface of the contact was observed under a microscope to make the evaluation in accordance with the following criteria. +: no aggregation was observed; ±: the black pigment was aggregated but the fluidity was confirmed; −: the black pigment was aggregated and the fluidity disappeared.

Evaluation Test 2 (Evaluation of Nozzle Clog-up)

A wiping test for the head nozzle surface was performed continuously 5,000 times at room temperature. The evaluation was made in accordance with the following criteria. In the wiping test for the head nozzle surface, the wiping is performed with a wiper simultaneously in the lateral direction for an array of nozzles for discharging the black ink and the color inks respectively. Therefore, the black ink and the color inks are in an environment in which they make contact with each other. +: the discharge failure and the curvature were not found at all; ±: the discharge failure and the curvature were found slightly, but the restoration was successful by the purge within five times; −: the discharge failure and the curvature were found frequently, and the restoration was unsuccessful by the purge for a short period of time.

Evaluation Test 3 (Evaluation of Durability of Suction Pump for Purge)

A test for the 10,000 times continuous suction purge was carried out at room temperature, and the evaluation was made in accordance with the following criteria. The black ink, the yellow ink, the magenta ink, and the cyan ink were successively sucked from the ink-jet head by using a purging suction pump. When the suction operation is performed, the contact is effected in the ink flow passage between the ink subjected to the sucking operation and the ink remaining in the ink flow passage of the pump (ink having any different color having been previously sucked). If any aggregation occurs due to the contact between the inks having the different colors, then the flow passage is clogged, and the suction amount per one time of suction is decreased. It is assumed that those which obtained the results of "++" and "+" in the following evaluation satisfy the acceptable level. ++: the amount per one time of suction was not less than a prescribed amount in the 10,000 times continuous suction purge; +: the amount per one time of suction was not less than a prescribed amount in the 5,000 times continuous suction purge; ±: the amount per one time of suction was not less than a prescribed amount in the 3,000 times continuous suction purge; −: the amount per one time of suction was not more than a prescribed amount in the 3,000 times continuous suction purge.

Results of Evaluation Tests 1, 2, and 3 are shown in Table 12.

TABLE 12

|  | Evaluation of aggregation | Evaluation of nozzle clog-up | Evaluation of durability of suction pump for purge |
| --- | --- | --- | --- |
| Example 1 | + | + | ++ |
| Example 2 | + | + | ++ |
| Example 3 | + | + | ++ |
| Example 4 | + | + | ++ |
| Example 5 | + | + | + |
| Example 6 | + | + | ++ |
| Example 7 | + | + | ++ |
| Example 8 | + | + | + |
| Comp. Ex. 1 | ± | − | − |
| Comp. Ex. 2 | ± | − | ± |
| Comp. Ex. 3 | − | − | − |
| Comp. Ex. 4 | − | − | − |
| Comp. Ex. 5 | − | − | − |
| Comp. Ex. 6 | ± | − | ± |
| Comp. Ex. 7 | − | ± | + |
| Comp. Ex. 8 | − | − | − |
| Comp. Ex. 9 | − | − | − |
| Comp. Ex. 10 | − | − | ± |
| Comp. Ex. 11 | − | − | − |

According to Table 12, in the case of the water base ink sets for ink-jet recording prepared in Examples 1 to 8, the black pigment dispersed in the black ink was not aggregated by the contact between the black ink and the color ink, and the problems due to the nozzle clog-up and the malfunction of the purging suction pump were not caused. On the other hand, the water base ink sets for ink-jet recording prepared in Comparative Examples 1 to 11 had problems in any of the results of Evaluation Tests 1, 2, and 3.

In the water base ink set for ink-jet recording of the present invention, when the black ink and the color ink are used in combination, then the black pigment dispersed in the black ink is not subjected to the aggregation which would be otherwise caused by the contact between the black ink and the color ink, and the sufficiently high durability is exhibited in the nozzle clog-up test and the test for the durability of the purging suction pump. When the water base ink set for ink-jet recording of the present invention is applied to an ink-jet printer, then the serious deterioration of the printing quality such as the discharge failure and the discharge curvature is not caused by the aggregation of the black pigment, and it is possible to guarantee the stable performance for the ink-jet mechanism for a long period of time.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing. The ink jet printer 100 is further provided with a wiper 88 adjacent to the purge cap 81. The wiper 88 wipes the nozzle surface to remove the ink on the surface.

Figure 2:
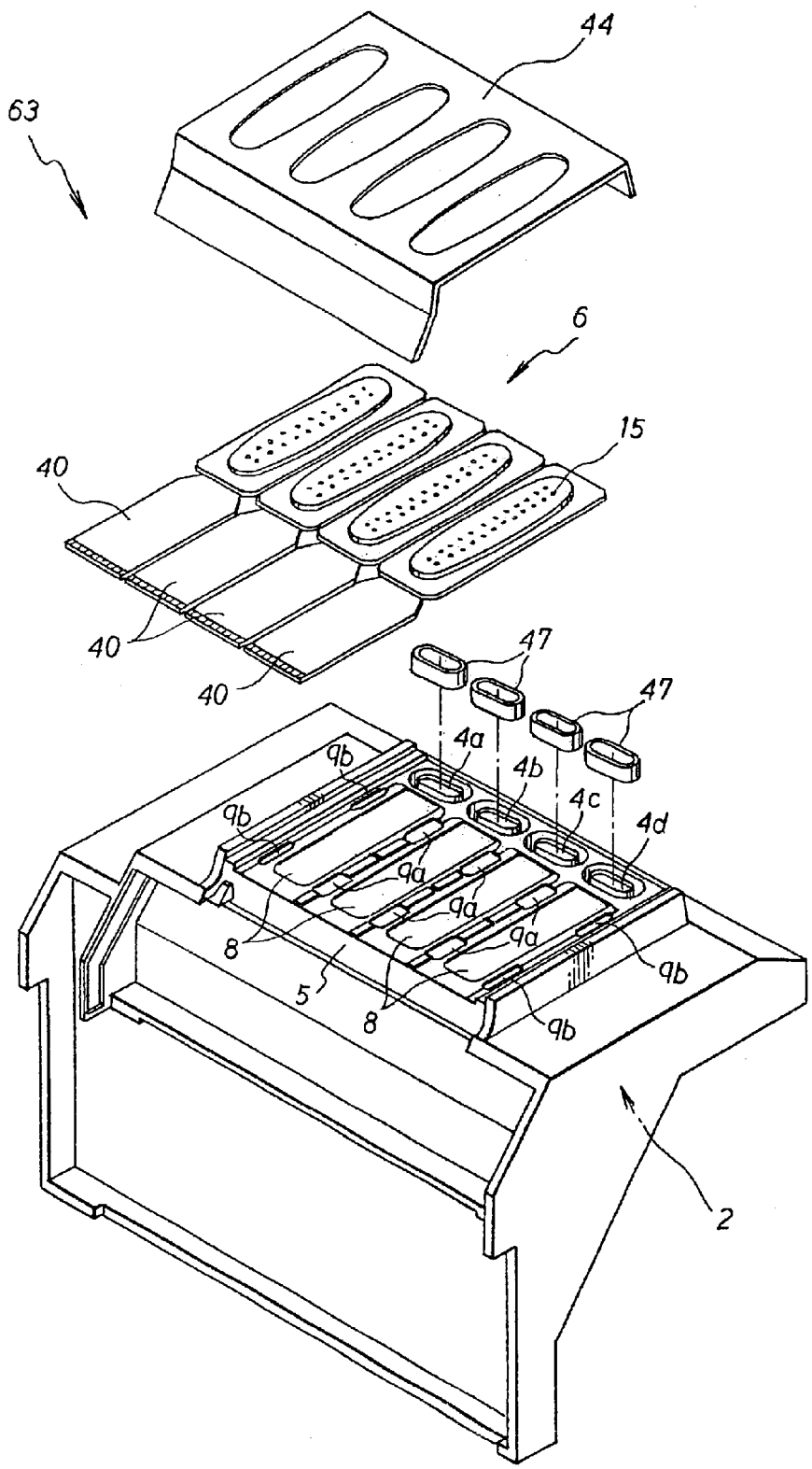
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
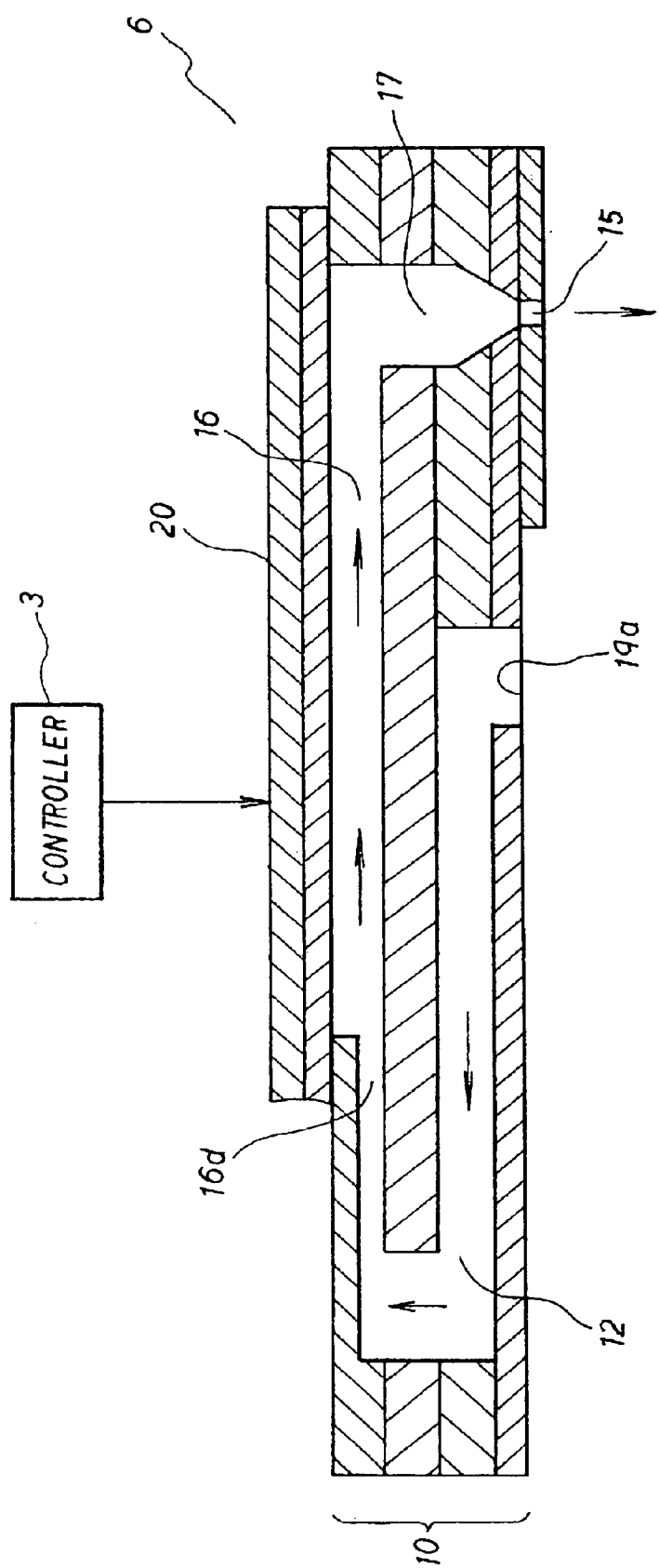
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 comprised of a plurality of thin metals which are formed of nickel or nickel alloy and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 B1 and 6,760,959. Further, the detailed structure of the printer and controlling method of the head it are also disclosed in these U.S. patents, a content of which has been incorporated herein by reference.

What is claimed is:

1. A water base ink set for ink-jet recording comprising a black ink and a color ink, wherein the black ink contains at least a black pigment, water; and a water-soluble organic solvent, and the color ink contains at least a dye, water, a water-soluble organic solvent, and at least one compound selected from the group consisting of a compound (2) represented by the following formula (2) and a compound (3) represented by the following formula (3):

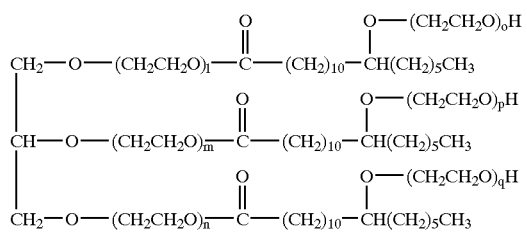
(2)

wherein l+m+n+o+p+q=20 to 100 is satisfied in the formula (2); and

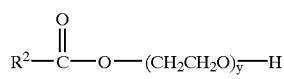
(3)

wherein $R^2$ represents a straight chain alkyl group having a number of carbon atoms of 16 to 22, and y=100 to 300 is satisfied in the formula (3).

2. The water base ink set for ink-jet recording according to claim 1, wherein the black pigment is a self-dispersing type black pigment having a surface to which a hydrophilicity-adding treatment is applied.

3. The water base ink set for ink-jet recording according to claim 1, wherein l+m+n+o+p+q=25 to 80 is satisfied in the compound (2).

4. The water base ink set for ink-jet recording according to claim 1, wherein $R^2$ of the compound (3) is a stearyl group having a number carbon atoms of 18, and y=140 to 250 is satisfied.

5. The water base ink set for ink-jet recording according to claim 1, wherein the black ink contains at least one compound selected from the group consisting of the compounds (2) and (3).

6. The water base ink set for ink-jet recording according to claim 1, which contains the compound (2) and the compound (1) represented by the following formula:

(1)

wherein $R^1$ represents a straight chain alkyl group having a number of carbon atoms of 16 to 22, and x=20 to 30 is satisfied in the formula (1).

7. An ink-jet recording apparatus comprising: an ink-jet head which jets a black ink and a color ink; and an ink tank which accommodates the black ink and the color ink, wherein: the black ink contains a black pigment, water, and a water-soluble organic solvent, and the color ink contains a dye, water, a water-soluble organic solvent, and at least one compound selected from the group consisting of compounds (2) and (3) represented by the following formulas:

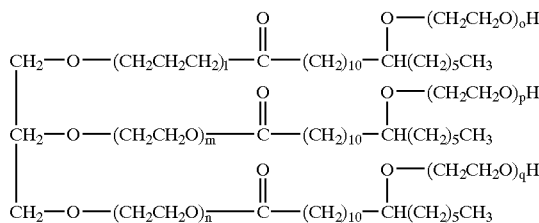
(2)

wherein l+m+n+o+p+q=20 to 100 is satisfied in the formula (2); and

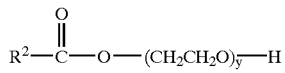
(3)

wherein $R^2$ represents a straight chain alkyl group having a number of carbon atoms of 16 to 22, and y=100 to 300 is satisfied in the formula (3).

8. The ink-jet recording apparatus according to claim 7, further comprising a wiper which wipes the ink-jet head.

9. The ink-jet recording apparatus according to claim 7, further comprising a purge unit which purges the ink-jet head.

10. The ink-jet recording apparatus according to claim 7, wherein the black pigment is a self-dispersing type black pigment having a surface to which a hydrophilicity-adding treatment is applied.

11. The ink-jet recording apparatus according to claim 7, wherein l+m+n+o+p+q=25 to 80 is satisfied in the compound (2).

12. The ink-jet recording apparatus according to claim 7, wherein $R^2$ of the compound (3) is a stearyl group having a number carbon atoms of 18, and y=140 to 250 is satisfied.

13. The water based ink set for ink-jet recording according to claim 6, wherein $R^1$ of the compound (1) is an oleyl group having a number of carbon atoms of 18, and x=23 to 25 is satisfied.

14. The ink-jet recording apparatus according to claim 7, wherein the color ink contains the compound (2) and a compound (1) represented by the following formula:

(1)

wherein $R^1$ represents a straight chain alkyl group having a number of carbon atoms of 16 to 22, and x=20 to 30 is satisfied in the formula (1).

15. The ink-jet recording apparatus according to claim 14, wherein $R^1$ of the compound (1) is an oleyl group having a number of carbon atoms of 18, and x=23 to 25 is satisfied in the formula (1).

* * * * *